United States Patent [19]

Braune

[11] Patent Number: 5,496,887
[45] Date of Patent: Mar. 5, 1996

[54] PREPARATION OF THERMOPLASTIC POLYESTERS HAVING A LOW CONTENT OF TERMINAL CARBOXYL GROUPS

[75] Inventor: Peter Braune, Büdesheim, Germany

[73] Assignee: BASF Aktiengesellschaft, Ludwigshafen, Germany

[21] Appl. No.: 370,985

[22] Filed: Jan. 10, 1995

[30] Foreign Application Priority Data

Jan. 15, 1994 [DE] Germany .......... 44 01 055.9

[51] Int. Cl.$^6$ .......... C08K 5/09
[52] U.S. Cl. .......... 524/777; 528/272; 528/275; 524/765
[58] Field of Search .......... 528/272, 275; 524/765, 777

[56] References Cited

U.S. PATENT DOCUMENTS

| | | | |
|---|---|---|---|
| 4,436,893 | 3/1984 | Cholod | 528/173 |
| 4,705,844 | 11/1987 | Espnschied et al. | 528/275 |
| 4,880,860 | 11/1989 | Blöcker | 524/94 |

FOREIGN PATENT DOCUMENTS

| | | |
|---|---|---|
| 029285 | 5/1981 | European Pat. Off. . |
| 215364 | 3/1987 | European Pat. Off. . |

*Primary Examiner*—Samuel A. Acquah
*Attorney, Agent, or Firm*—Keil & Weinkauf

[57] ABSTRACT

Thermoplastic polyesters are prepared by polycondensation of dihydroxy compounds with dicarboxylic acids or their esters or ester-forming derivatives by a process in which an alkali metal compound or an alkaline earth metal compound is added in an amount of less than 1 mmol, calculated as alkali metal or alkaline earth metal, per kg of polyester.

6 Claims, No Drawings

PREPARATION OF THERMOPLASTIC POLYESTERS HAVING A LOW CONTENT OF TERMINAL CARBOXYL GROUPS

The present invention relates to a process for the preparation of thermoplastic polyesters by polycondensation of dihydroxy compounds and dicarboxylic acids or their esters or ester-forming derivatives.

Processes of the abovementioned type are carried out industrially on a large scale worldwide, particularly for the preparation of polyalkylene terephthalates.

However, it is found that the content of terminal carboxyl groups (COOH number) also increases with increasing viscosity, making the product less stable, in particular less stable to hydrolysis. In the preparation of polymer blends or polymer mixtures, for example with polycarbonates or styrene copolymers, a high COOH number leads to undesirable transesterifications.

The presence of alkali metal compounds in the polycondensation is known per se and is described, for example, in EP-A 215 364 and EP-A 29 285. According to EP-A 29 285, the amounts of added alkali metal compound are from about 0.1 to 2% by weight, based on polyester, or from 0.02 to 1 mol per kg of polyester (EP-215 364). However, such relatively large amounts in the end product are disadvantageous for many applications.

It is an object of the present invention to provide a process for the preparation of polyesters of the type stated at the outset, which gives a product having a low COOH number at the same viscosity.

We have found that this object is achieved, according to the invention, if, in a process for the preparation of thermoplastic polyesters by polycondensation of dihydroxy compounds with dicarboxylic acids or their esters or their ester-forming derivatives, an alkali metal compound or an alkaline earth metal compound is added in an amount of less than 1 mmol, calculated as alkali metal or alkaline earth metal, per kg of polyester.

The novel process gives polyesters which have lower COOH numbers at the same viscosity. In addition, the resulting product has a paler color, is more stable to hydrolysis and is more suitable for the preparation of polymer blends or polymer mixtures. The novel process also has the advantage that the preparation of the polyesters takes place uniformly and, if the diol component used is 1,4-butanediol, that a smaller amount of 1,4-butanediol is converted into tetrahydrofuran in a secondary reaction. Furthermore, the polyesters thus prepared can also be subjected to a solid-phase condensation (heating under a nitrogen atmosphere), with the result that polyesters having a high molecular weight are obtainable.

The dihydroxy compounds used may be aliphatic, aromatic or cycloaliphatic diols.

Advantageously, these are of 2 to 20, in particular 2 to 12, carbon atoms, aliphatic diols of 2 to 12, in particular 2 to 6, carbon atoms being particularly preferred.

Examples of these are ethanediol (ethylene glycol), 1,3-propanediol, 1,4-butanediol, cyclohexanediols, hydroquinone, resorcinol and bisphenol A, of which ethanediol and 1,4-butanediol are particularly preferred.

The dicarboxylic acids used may be aliphatic and/or aromatic dicarboxylic acids of, preferably, 4 to 20, in particular 4 to 12, carbon atoms.

Examples are isophthalic acid, phthalic acid, terephthalic acid, alkyl-substituted derivatives of the abovementioned acids, 2,6-and 2,7-naphthalenedicarboxylic acids, aliphatic dicarboxylic acids, such as succinic acid, adipic acid, sebacic acid, azelaic acid and decanedicarboxylic acid, of which isophthalic and terephthalic acid or mixtures thereof are particularly preferred.

From the above, it is evident that polyalkylene terephthalates or polyalkylene isophthalates or copolyesters with terephthalic and isophthalic acid as acid components can be particularly advantageously prepared by the novel process.

In addition to the abovementioned components, the polyesters prepared according to the invention may also contain relatively small amounts, advantageously less than 10 mol %, based on the particular monomer component, of further units which are derived, for example, from hydroxycarboxylic acids.

In a first stage of the novel process, less than 1, preferably from 0.1 to 0.9, in particular from 0.2 to 0.7, mmol (calculated as alkali metal or alkaline earth metal) of an alkali metal compound or alkaline earth metal compound is added per kg of polyester during the reaction of the starting monomers in a manner known per se.

In principle, inorganic and organic compounds of the alkali metals, preferably of Li, Na or K, particularly preferably sodium compounds, are suitable.

Examples of suitable inorganic compounds of the alkali metals or alkaline earth metals, preferably of sodium, are the corresponding silicates, phosphates, phosphites, sulfates or, preferably, carbonates, bicarbonates and hydroxides.

The organic compounds of the alkali metals or of the alkaline earth metals, preferably of sodium, include the corresponding salts of (cyclo)aliphatic, araliphatic or aromatic carboxylic acids having, preferably, up to 30 carbon atoms and, preferably, 1 to 4 carboxyl groups. Examples of these are alkali metal salts of formic acid, acetic acid, propionic acid, butyric acid, isobutyric acid, caprylic acid, stearic acid, cyclohexanecarboxylic acid, succinic acid, adipic acid, suberic acid, 1,10-decanedicarboxylic acid, 1,4-cyclohexanedicarboxylic acid, terephthalic acid, 1,2,3-propanetricarboxylic acid, 1,3,5-cyclohexanetricarboxylic acid, trimellitic acid, 1,2,3,4-cyclopentanetetracarboxylic acid, pyromellitic acid, benzoic acid, substituted benzoic acids, dimeric acids and trimeric acids and neutral or partly neutralized montan wax salts or montan wax ester salts (montanates). Salts with acid radicals of other types, for example alkali metal paraffinsulfonates, alkali metal olefinsulfonates and alkali metal arylsulfonates, or phenolates and alcoholates, for example methylates, ethylates or glycolates, can also be used according to the invention. Sodium carbonate, sodium bicarbonate, sodium hydroxide, sodium salts of mono- and polycarboxylic acids, in particular the aliphatic mono- and polycarboxylic acids, preferably those having 2 to 18, in particular 2 to 6, carbon atoms and up to four, preferably up to two, carboxyl groups, and sodium alcoholates of, preferably, 2 to 15, in particular 2 to 8, carbon atoms are preferably used. Examples of particularly preferred members are sodium acetate, sodium propionate, sodium butyrate, sodium oxalate, sodium malonate, sodium succinate, sodium methylate, sodium ethylate and sodium glycolate. Sodium methylate is very particularly preferred and is particularly advantageously used in an amount of from 0.2 to 0.7 mmol, calculated as sodium. Mixtures of different alkali metal and alkaline earth metal compounds may also be used.

The alkali metal or alkaline earth metal or the alkali metal compound or alkaline earth metal compound is added at any time during a first stage of the synthesis of the polyester, in general after the esterification/polycondensation process, but preferably after the transesterification/polycondensation process. The addition at the beginning of the transesterification is particularly preferred when the transesterification/polycondensation process is used. The esterification/polycondensation process and the transesterification/polycondensation process are well known and are described, for example, in Ullmann's Encyklopädie der technischen Chemie (4th edition) 19 (1980), 61–88.

After their preparation, polyesters prepared by the novel process can also be heated, with the result that an increase in the viscosity can be achieved. Usually, heating is effected at from 190° to 220° C., preferably from 200° to 210° C., over a period of from 15 to 35, preferably from 18 to 26, hours.

EXAMPLES

Example 1

In the preparation of a polyester from dimethyl terephthalate and 1,4-butanediol by the transesterification/polycondensation process, 0.6 mmol (based on 1 kg of polyester formed in a complete stoichiometric reaction) of sodium in the form of sodium methylate was added as early as the transesterification, ie. with addition of the monomers, and the product was subjected to condensation reaction in the melt or in solution.

A product which had a viscosity number VN of 130 and a COOH number of 20 was obtained.

The product was then heated under a nitrogen atmosphere at 205° C. over a period of 24 hours. It then had a viscosity number VN of 180 and a COOH number of 8.

Example 2

The procedure was as in Example 1, except that 0.36 mmol of sodium in the form of sodium methylate was added during the transesterification. A product which had a viscosity number VN of 130 and a COOH number of 22 was thus obtained.

This product, too, was heated at 205° C. for 24 hours. It then had a VN of 175 and a COOH number of 10.

Comparative Example V1

The procedure was as in Example 1, except that no sodium methylate was added. A product which had a VN of 130 and a COOH number of 52 was obtained.

After heating, the product had a VN of 150 and a COOH number of 40.

The products from Examples 1 and 2 were paler and more stable to hydrolysis than the product from Comparative Example V1.

The viscosity numbers VN were determined according to DIN 53728, part 3 (January 1985).

The following procedure was adopted for determining the COOH numbers:

100 mg of polyester were dissolved in 7 ml of nitrobenzene at 200° C. This solution was cooled to 150° C. and diluted with 7 ml of a mixture of 2 g of potassium acetate per 1 of solution, the solution consisting of 10% by weight of water and 90% by weight of isopropanol. Potassium was bonded to the polyester, and the liberated acetic acid was titrated.

We claim:

1. A process for the production of thermoplastic polyesters which process consists essentially of polycondensing dihydroxy compounds with dicarboxylic acids or their esters or ester-forming derivatives in the presence of an alkali metal compound or an alkaline earth metal compound in an amount of less than 1 mmol, calculated as alkali metal or alkaline earth metal, per kg of polyester.

2. A process as defined in claim 1, wherein the alkali metal compound is an organic alkali metal compound.

3. A process as defined in claim 1, wherein the alkali metal compound is an alcoholate.

4. A process as defined in claim 1, wherein the alkali metal compound is sodium methylate.

5. A process as defined in claim 1, wherein the alkali metal compound or alkaline earth metal compound is added in an amount of from 0.1 to 0.9 mmol, calculated as alkali metal or alkaline earth metal, per kg of polyester.

6. In a process for the preparation of a thermoplastic polyester from dimethyl terephthalate and 1,4-butanediol by a transesterification/polycondensation process, the improvement which comprises: adding to the reaction mixture along with the dimethyl terephthalate and 1,4-butanediol from 0.1 to 0.9 mmol of sodium methylate.

* * * * *